June 28, 1949.    J. B. AMSTUTZ ET AL    2,474,771
AIR OPERATED CHUCK
Filed Jan. 23, 1947    3 Sheets-Sheet 1
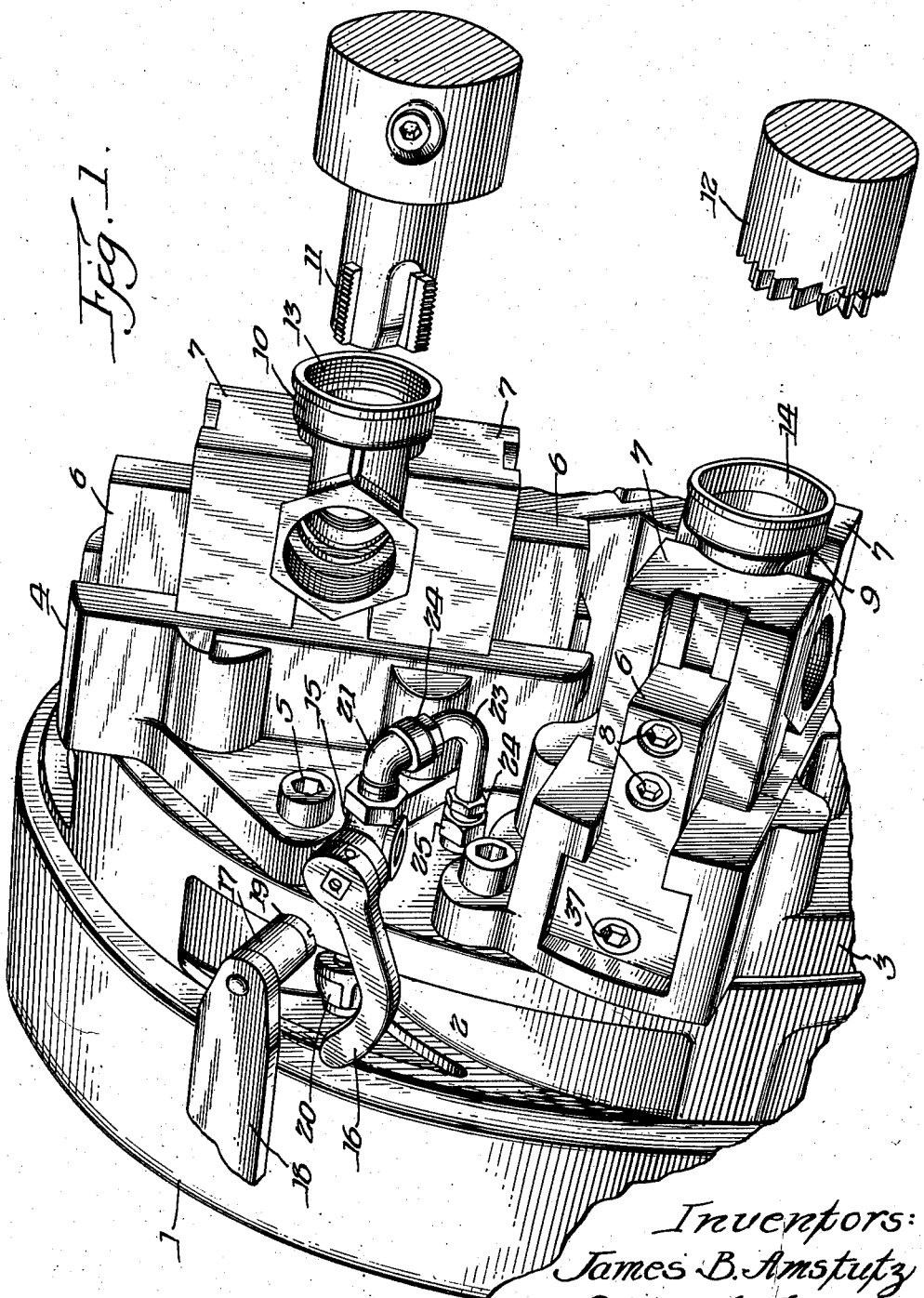
Inventors:
James B. Amstutz
Otto E. Fieroh
By Joseph P. Lange, Atty.

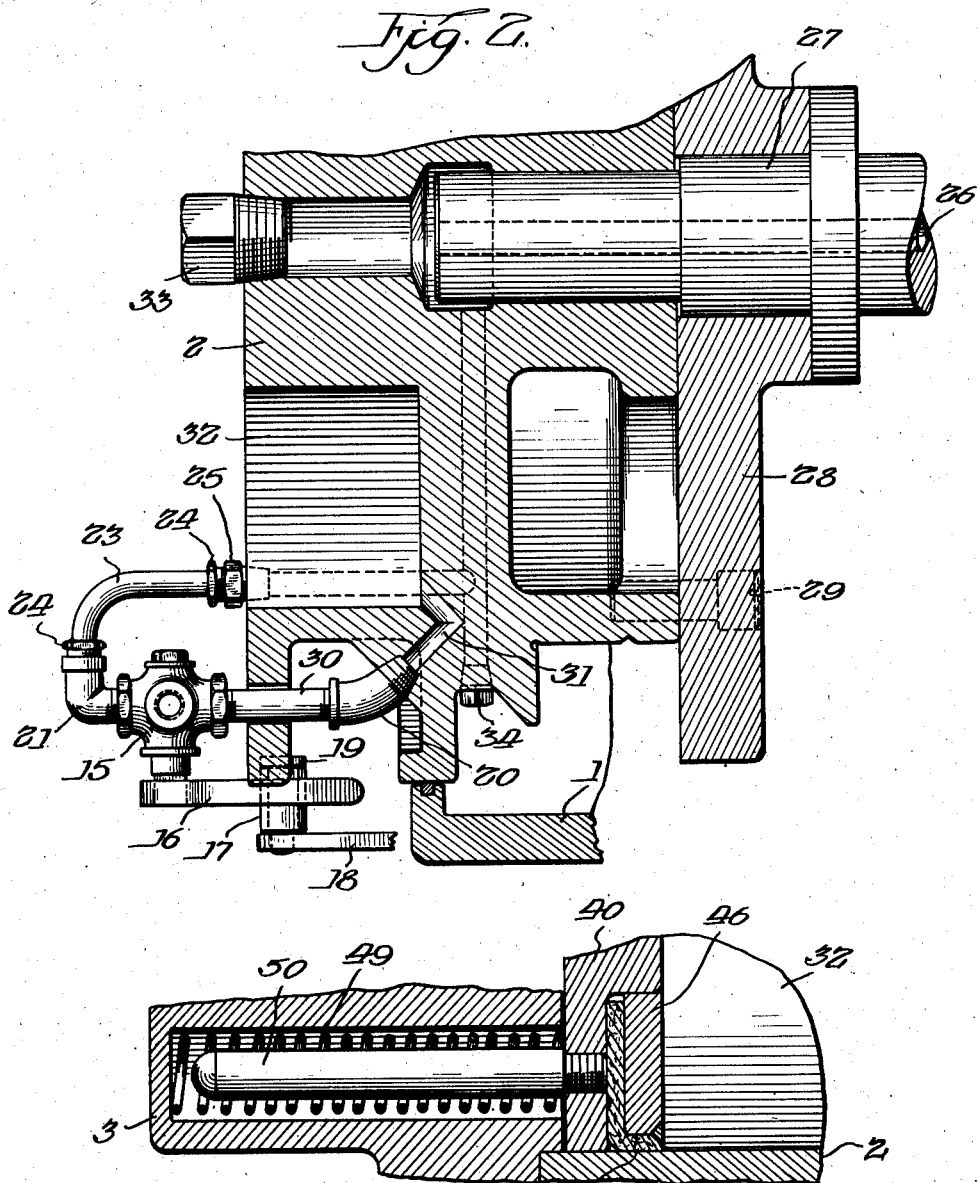

June 28, 1949.   J. B. AMSTUTZ ET AL   2,474,771
AIR OPERATED CHUCK
Filed Jan. 23, 1947   3 Sheets-Sheet 3
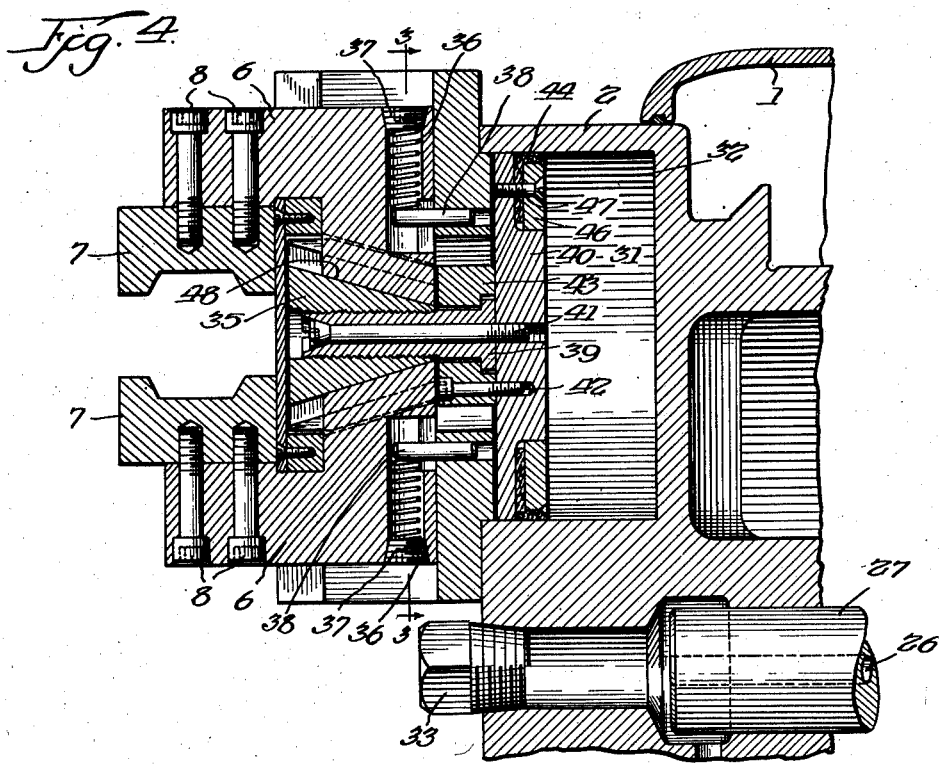
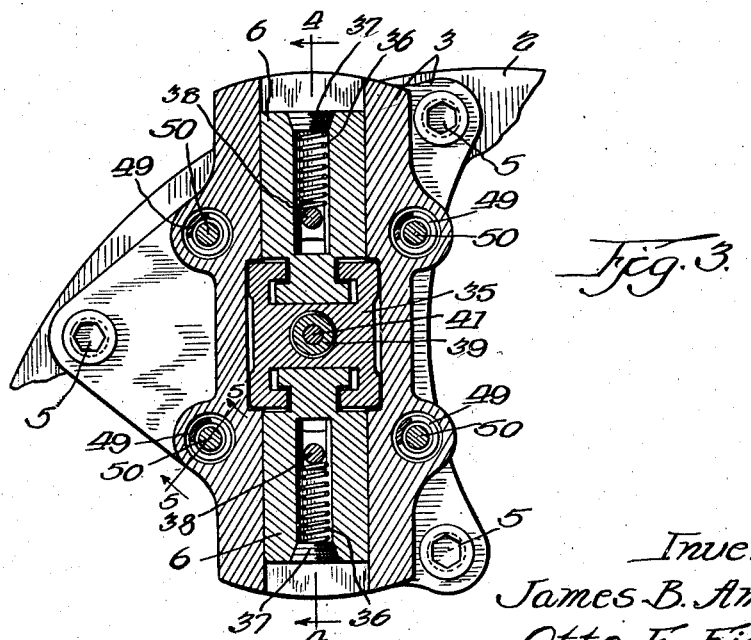
Inventors:
James B. Amstutz
Otto E. Fieroh
By Joseph O. Lange   Atty.

Patented June 28, 1949

2,474,771

UNITED STATES PATENT OFFICE 2,474,771

AIR OPERATED CHUCK

James B. Amstutz, Oak Park, and Otto E. Fieroh, Chicago, Ill., assignors to Crane Co., Chicago, Ill., a corporation of Illinois Application January 23, 1947, Serial No. 723,688

4 Claims. (Cl. 279—4)

This invention relates to a lathe chuck or the like and more particularly it refers to a novel air operated chuck which grips articles to be subsequently threaded, or otherwise suitably machined or worked upon in semi-automatic chucking machines.

The chuck of the instant invention finds a preferred application in the conventional rotating feed ends mounted in a vertical plane which move the article or a plurality of articles predeterminedly towards and into the cutting paths of rotating tools mounted in the head of conventional semi-automatic chucking machines and the like.

An important advantage of this novel contribution is that through a multiple arrangement of individual air operated gripping or holding means arranged about the periphery of a rotatable feed end and preferably mounted parallel to the face of the head of the machine with a plurality of mechanically mounted cutting tools or the like in the head of the machine, a number of machining operations may be made at one time thereby accelerating the machining of such parts.

A further advantage of this air operated chuck device lies in the provision that a proper grasp is maintained on the part or particle to be worked without the necessity of any of the usual manual or mechanical adjustments.

A further advantage of this invention is that it aids considerably in the mass production of items or parts by shortening the time normally required for the total machining operations by reducing the amount of time required for chucking and hence it saves considerable in time and set-up costs.

Other advantages and objects arising from this invention will become more readily apparent upon proceeding with the following specifications read in light of the accompanying drawings in which:

Fig. 1 is an exterior perspective view showing two chucks of a multiply-mounted chuck feed end with their respective cutting tools in place.

Fig. 2 is an enlarged sectional view of the air inlet system employed.

Fig. 3 is a fragmentary sectional view of one of the units of the chuck mechanism taken on the line 3—3 of Fig. 4.

Fig. 4 is a fragmentary sectional view of one of the units of the chuck mechanism taken on the line 4—4 of Fig. 3.

Fig. 5 is a fragmentary sectional view of the release spring.

Similar reference characters refer to similar parts in the several views shown.

Referring now to Fig. 1, the feed end 1 is preferably a non-revolving but reciprocably movable part of a conventional semi-automatic chucking machine (not shown). The face plate 2 by means of a rotating shaft (not shown) connected to the mechanism within the feed end 1 thus provides the desired reciprocating and revolving motion for which the article of my invention is intended. To the face plate 2 are fastened several chuck bodies, two of which are shown at 3 and 4, and which are attached to the face plate 2 by means of the socket head cap screws 5. Within the chuck body 3 and 4 the jaws 6 are mounted and these support the blocks or chuck blocks 7, by means of the machine screws 8. In the view shown, the conventional valve bodies 9 and 10 are shown for illustration as parts that are being machined but of course other parts may be used depending upon the operations required. The thread cutter or tap 11 and the reamer 12 are also examples of rotating members shown in fragmentary section and are fastened to the conventional machine head which is also not shown, being non-essential to the invention disclosure.

In Fig. 1, the part 10 or the valve body in the case shown, is shown after the operation in which it had moved on to the thread cutter 11, the latter member preferably rotating and also having had sufficient reciprocating motion to cut the thread 13 to the desired depth in the body 10. It should be assumed that previous to the latter operation the part 10 was in the position of the part 9, as shown, mounted in its corresponding chuck 3 where it had first received its reamed surfaces 14 upon moving over the rapidly revolving reamer 12.

Equally spaced about the periphery of the face plate 2 are a number of air valves or cocks 15, the amount of the latter being equal to the number of individual chucks required, and these are mounted integrally within the said face plate 2 and between the chuck bodies, as for instance, the air valve 15 is shown between the two chuck bodies 3 and 4. Each air valve controls the operation of each adjacent chuck to its right end and therefore the air valve 15 controls the operation of the chuck 4.

As the face plate 2 revolves from one machining operation position to another the valve cam handle 16 of the air valve 15 strikes the roller 17 held to the roller support 18 which is partially shown, and which is mounted rigidly to the nonrotatable feed end 1. The screw 19 (head only shown) holds the roller 17 to the roller support 18. Upon striking and moving past the roller, the cam handle rotates 90 degrees and the air valve 15 is closed to thereby release the pressure in the chuck mechanism thereby causing the jaws 6 and blocks 7 to release their grip on the part being machined, as in this case the valve body 9. The machine operator may then remove this finished piece and install an unfinished one; and upon manually opening the valve the new piece will be grasped by the jaws 6 and blocks 7 and then moves through the subsequent machining cycle, a portion of which has been described above.

Connected to the air valve 15 are the conventional tubing and fittings such as a 45 degree street L designated 20, an elbow 21, the tubing 23, the bushings 24 and a coupling 25. This assembly is more significant when viewed in Fig. 2 which is a fragmentary sectional view of the face plate 2 and the connecting air fittings taken on a line through the center and along an oblique line through the air valve 15 showing a portion of the air chamber 32. The air enters the machine head assembly through the air inlet 26 (Fig. 2) and through a conventional rotating pressure joint, not shown, but which is attached to the shaft 27 shown in section. The face plate 2 is attached to the shaft 27 and the shaft flange 28 by means of the bolts 29; and thus the face plate 2 is arranged to respond to the combined rotary and reciprocal movement of the shaft 27. The latter shaft member is made integrally engaged in the shaft flanges 28 by any conventional fastening means to effect a sealed joint therebetween.

The air or other fluid, after passing through the shaft 27 moves through the respective passage ways to the individual air valves such as 15. In Fig. 2, the piping shown is representative of a conventional application. The coupling 25, the bushings 24, and the tubing 23 are piped to the air valve 15 while the nipple 30 and the 45 degree street L 20 lead to the air chamber 32 with the inlet 31. The pipe plugs 33 and 34 (shown in dotted lines) are used merely to seal the end openings made in providing the radially extending air passage ways also shown in dotted lines. The air valve 15 is a conventional three-way plug valve or cock which when positioned with the valve cam handle 16 as shown parallel to the line of flow allows the air to pass into the air chamber 32. Thus if the valve cam handle 16 is turned to extend at right angles to that shown, which occurs when the complete unit revolves, the valve cam handle 16 is caused to ride and be turned by the roller 17. In the latter position the air above the valve 15 would then be shut off and upon the occurrence of such operation within the chamber 32 it would exhaust through the air valve 15.

In considering the manner in which the chucks are actuated, attention is directed to Fig. 3 in which a detailed cross-sectional view is shown of one of the chuck mechanism employed. The T-shaped lugs or section of the jaws 6 engages the interlocking and recessed section of the wedge 35. The springs 36 act to maintain a load against the interlocking means of the wedge 35, the air inlet 31 leading to the chamber 32 being the same as the inlet 31 shown in Fig. 2.

Directing attention now to Fig. 4 showing a fragmentary sectional detail of the clutch mechanism, the chuck body 3 is attached to the face plate 2 by means of the cap screws 5. The jaws 6 to which are fastened the chuck blocks 7 by means of the screws 8 ride in and out of the chuck body 3, their movement being dependent upon that of the wedge member 35, their pressure being maintained against the interlocking means of the wedge 35 by the springs 36 held in place by the pipe plug 37 and the pin 38. The wedge 35 is threadedly engaged to the piston rod 39, this unit being fastened to the piston 40 by means of the cap screw 41 and the screws 42 which connect the piston rod clamp 43 to the piston 40. An important feature of the piston rod 39 is that upon loosening the scap screw 41 the centrally located piston rod 39 may be rotated in its threaded engagement in the wedge 35 thus providing an adjustment for the wedge in relation to the piston 40 as well as to the jaws 6. This adjustment governs the positioning of the jaws 6 and the blocks 7 while in the closed or holding position. The latter piston member is supplemented by the cup type piston packing 44 and the clamp ring 46 which is held in place as shown by means of the screws 47.

With an increase in pressure in the chamber 32 by allowing air to enter through the inlet 31, the pressure of the latter fluid bears against the piston 40 and as the piston moves forward, to the left in Fig. 3, carrying the wedge member 35 also forward, the jaws 6 bear against the latter wedge member and in riding down the interlocking inclined plane 48 of the wedge 35 they move towards the center. The chuck blocks 7 fastened to the jaws 6 by means of the screws 8 are thereby brought close together. It will thus become apparent that upon placing an object to be gripped between the two chuck blocks 7 the object would be engaged in the blocks and securely held for subsequent machining.

Upon release of the air pressure by a 90 degree rotating of the valve cam handle 16 the springs 49 (see Fig. 5) return the piston to its open position. The jaws 6 and the chuck blocks 7 then ride up on the interlocking inclined plane 48 of the wedge 35, thus moving outward to release their grip on the article formerly held. The guide pin 50 serves to maintain the location of the spring 49, as shown in Figs. 3 and 5.

The opening of the air valve 15 by the machine operator, thus causing the unmachined article to be grasped in the chuck mechanism, starts the article on its course where in predetermined and preselected locations upon the partial rotation and alternate reciprocable movement of the feed of the semi-automatic chucking machine it receives successive and additional machining or threading operations as desired. It should, of course, be understood that the machining of the article is done along only one axis of the article at any one given time as illustrated in Fig. 1 although the fluid operated chuck of the instant invention is useful in accomplishing multiple machining operations. Upon receiving its predetermined number of machine operations and during the final indexing the article is automatically released in the chuck mechanism when the cam handle or lever arm 16 of the air valve strikes the roller 17 and arm 18 which causes the valve to close thus releasing the pressure in the chuck actuating mechanism. The operator then removes the machined article and inserts an unfinished one in its place. The above described cycle concerns only a single article; however, it should be further understood that the current contribution is capable of handling a plurality of articles simultaneously and upon the partial rotation to predetermined positions a multiple number of articles may receive their respective additional machining operations.

It should thus be apparent that the novelty of this invention resides not only in the single chuck as described immediately above, but in the arrangement of a plurality of such chucks which when paralleled with a number of cutting, broaching or threading tools allows for machining a plurality of articles simultaneously.

It should be clear from the foregoing that the structural details may vary quite substantially from that shown and described and therefore it is the desire that the scope of this invention be measured by the appended claims interpreted in light of the prior art.

We claim:

1. A fluid operated chuck comprising in combination a set of jaws, fluid conveying means for effecting actuation of the said chuck, chuck blocks attached to the chuck for holding articles to be machined, a wedge member for holding the said jaws in spaced apart relationship so that upon predetermined movement of the said wedge member relative to the said jaws the latter members are reciprocably moved, a fluid chamber within the chuck cooperating with the said fluid conveying means, piston means fastened to the said wedge member, and valve means actuated upon rotation of the said chuck for release of fluid pressure from the said chuck chamber whereupon the said jaws move apart upon the said wedge member to thereby release the machined article.

2. An air operated chuck comprising in combination a set of jaws, fluid conveying means for operating the chuck, chuck blocks cooperating with the said jaws for holding an object to be machined, a wedge member holding the said jaws in spaced apart relationship so that upon sliding movement of the wedge member upon the said jaws the latter members are moved in a reciprocable manner, the said chuck having a fluid chamber communicating with the said fluid conveying means, a piston attached to the said wedge member, and control means for releasing the fluid pressure in the said fluid chamber upon predetermined rotative movement of the chuck whereby the said jaws move outward to release their grip on the machined object.

3. A fluid operated chuck comprising in combination a set of jaws, fluid conveying means for effecting actuation of the said chuck, chuck blocks attached to the chuck for holding articles to be machined, a wedge member for holding the said jaws in spaced apart relationship so that upon predetermined movement of the said wedge member relative to the said jaws the latter members are reciprocably moved, a fluid chamber within the chuck cooperating with the said fluid conveying means, piston means normally in the open position fastened to the said wedge member, resilient means cooperating with the said piston means, valve means actuated upon rotation of the said chuck for release of fluid pressure from the said chuck chamber whereupon the said jaws move apart upon the said wedge member to thereby release the machined article, the said resilient means returning the said piston to said open position.

4. An air operated chuck comprising in combination a set of jaws, fluid conveying means for operating the chuck, chuck blocks cooperating with the said jaws for holding an object to be machined, a wedge member with an interlocking inclined plane and holding the said jaws in spaced apart relationship so that upon sliding movement of the wedge member upon the said jaws the latter members are moved in a reciprocable manner, the said jaws and chuck blocks upon release of air pressure riding up on said inclined plane of the wedge member to release their grip on the object being machined, the said chuck having a fluid chamber communicating with the said fluid conveying means, a piston attached to the said wedge member, and control means for releasing the fluid pressure in the said fluid chamber upon predetermined rotative movement of the chuck.

JAMES B. AMSTUTZ.
OTTO E. FIEROH.

REFERENCES CITED

The following references are of record in the file of this patent:

UNITED STATES PATENTS

| Number | Name | Date |
| --- | --- | --- |
| 1,181,844 | Church | May 2, 1916 |
| 1,284,225 | Bogart | Nov. 12, 1918 |
| 1,413,330 | Grace | Apr. 18, 1922 |
| 2,326,371 | Le Tourneau | Aug. 10, 1943 |